Oct. 29, 1940.   D. A. ROGERS   2,219,333
PRODUCTION OF PHTHALIC ANHYDRIDE
Filed Dec. 31, 1934
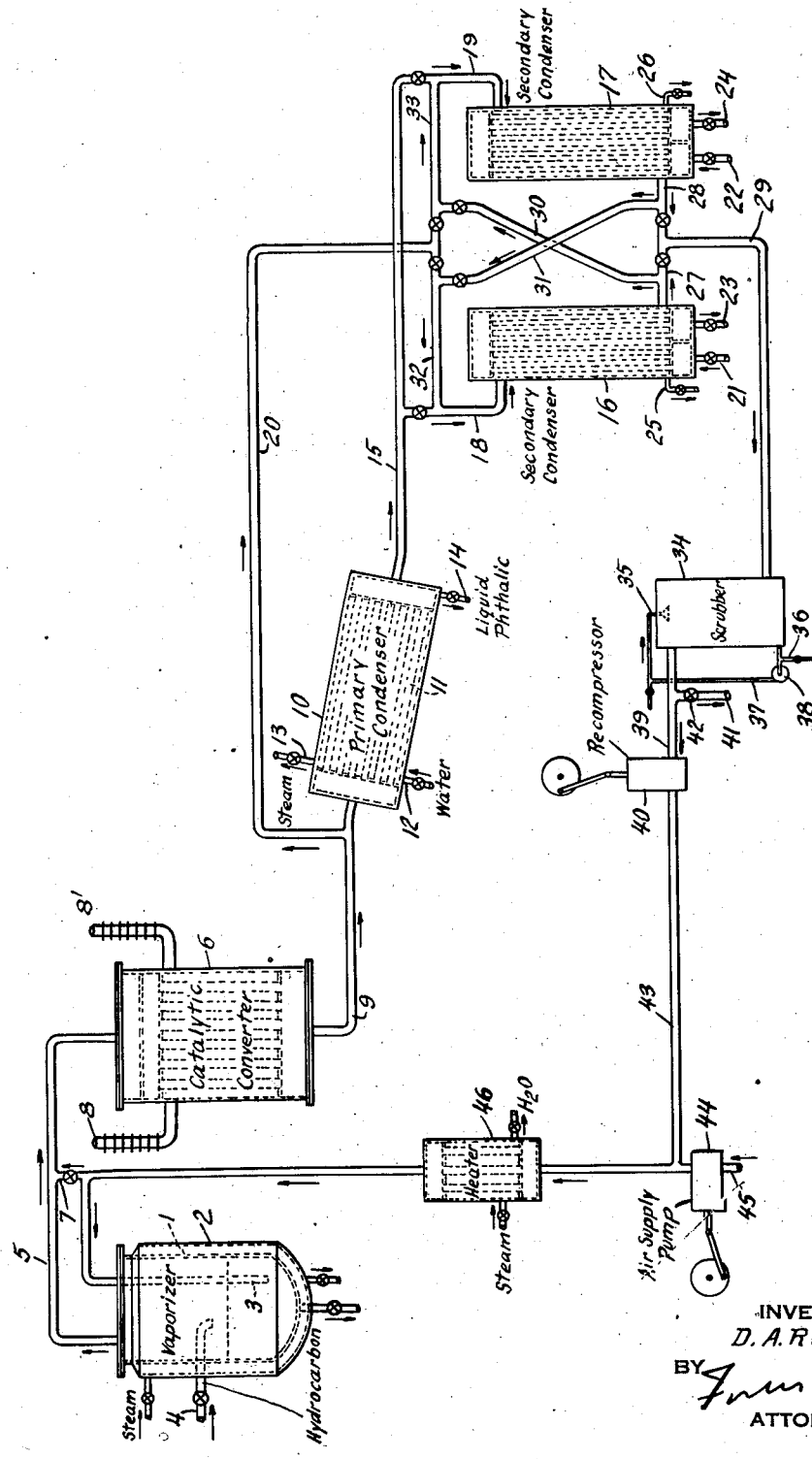
INVENTOR
D. A. Rogers
BY
ATTORNEY Patented Oct. 29, 1940

2,219,333

UNITED STATES PATENT OFFICE 2,219,333

PRODUCTION OF PHTHALIC ANHYDRIDE

Donald A. Rogers, Petersburg, Va., assignor, by mesne assignments, to The Solvay Process Company, New York, N. Y., a corporation of New York Application December 31, 1934, Serial No. 759,969

8 Claims. (Cl. 260—343)

This invention relates in general to the partial oxidation of hydrocarbons and is particularly directed to improvements in the catalytic oxidation of polynuclear aromatic compounds, for instance naphthalene, anthracene, naphthoquinone, or alkyl-naphthalenes wherein one ring contains one or more alkyl groups, to phthalic anhydride.

The invention has for its objects simplification of the recovery process thus permitting the use of less costly apparatus, reduction of health hazards, and improvement in the efficiency of operation of the phthalic anhydride recovery system.

In the ordinary synthesis of phthalic anhydride by the catalytic oxidation of naphthalene, a mixture of naphthalene vapor and air in a weight ratio of from 25 to 35 parts of air for one part of naphthalene (representing a molar or volume ratio of naphthalene to total gas from about 1:110 to 1:160) is supplied at a pressure of about 2 to 3 atmospheres absolute and at a temperature of 200° to 350° C. to a catalytic converter containing a bed of a solid oxidation catalyst, for example vanadium oxide, cooled by indirect heat exchange with a medium such as a mercury bath, boiling under pressure so that the temperature in the converter is maintained between 475° and 600° C. By its passage through the catalyst bed, the naphthalene is oxidized mainly to phthalic anhydride but considerable quantities of other products, for example maleic acid, naphthoquinone, coumarin, carbon dioxide, water, and usually traces of tarry matter also are formed.

The reaction product leaving the converter at around atmospheric pressure or slightly above and comprising the above-mentioned constituents in vapor or gaseous phase, nitrogen, and excess oxygen, is passed through a cooler or series of coolers in which it is cooled to condense phthalic anhydride as a solid. After condensation of phthalic anhydride the remaining gases may be scrubbed to eliminate maleic anhydride fumes and are expelled to the atmosphere.

In accordance with the present invention, the conditions of phthalic anhydride production and recovery are so regulated that at least a substantial proportion of the total phthalic anhydride product is recovered in liquid phase rather than solid phase. By this method of operation the efficiency of the recovery system is augmented, and cooling apparatus and cooling fluids serve to better advantage than in former systems.

The improvement resulting from the method of the present invention may be appreciated by comparison with the common method of recovering phthalic anhydride in large air-cooled chambers wherein the phthalic anhydride collects as a solid crystalline product. Not only do the cooling chambers occupy a large volume of placement space but periodically the walls of the chambers become so incrusted with the crystalline product that workmen must enter the chambers to free them from these deposits. The fumes within the cooling chambers and to which the workmen are exposed are of an extremely noxious character, and highly irritating to the mucous membranes. Upon opening the chambers, some of the fumes escape and these escaping fumes may render an entire building temporarily uninhabitable.

In view of the many disadvantages of the cleaning process, not to mention the trouble and labor involved, it will be evident that a method for eliminating such cleaning steps or even reducing their frequency is a distinct advance in the art. By recovery of a portion of the phthalic anhydride in liquid phase, the quantity to be recovered as a solid may be reduced to only a fraction of the total output. Hence, if the residual product were recovered as solid in a chamber cooler of the type above considered, cleaning would be required much less frequently than otherwise or else a much smaller chamber cooler might be employed.

It is preferred to employ the present process of recovering phthalic anhydride as liquid in combination with a solid phthalic anhydride recovery step which does not require periodic exposure of workmen to fumes contained in the reaction gases. For example, an intermittently operated condenser provided with means for periodically heating the walls thereof and thus causing phthalic anhydride deposits to thaw and flow off as liquid may be employed. But the invention may, of course, be used in combination with any desired type of second cooling or recovery step.

In order to accomplish recovery of phthalic anhydride in liquid phase, the primary condensation should be effected at a temperature above the melting point of the phthalic anhydride. For the ratios of air to naphthalene normally employed a pressure above 30 pounds per square inch absolute is preferably maintained in the primary condenser to give the desired result. The pressure required will depend upon the proportion of phthalic anhydride in the gas-vapor mixture, being relatively high for relatively small proportions of phthalic anhydride and relatively low for larger proportions, but in any case it should be sufficient to raise the dew-point of the phthalic anhydride in the gas mixture to a temperature above its melting point.

In carrying out this process with the customary air-naphthalene ratio (say a 30:1 weight ratio or a 100:0.75 molar ratio) the mixture is passed through the converter at an elevated pressure and reaction products are passed from the converter to a primary condenser while still under a pressure above atmospheric, say between 30 pounds and 300 pounds per square inch absolute. In this primary condenser the gases are cooled to condense phthalic anhydride in liquid form, the temperature drop being limited so as to prevent formation of solid phthalic anhydride. The gases are then further cooled to separate the remaining phthalic anhydride in solid phase. This further cooling may result in the formation of solid phthalic anhydride on the walls of the cooling vessel or secondary condenser. Accordingly the cooling step may be carried out in an intermittent condenser wherein, after substantial condensation of phthalic anhydride has been effected, hot reaction gases are passed through the condenser to melt the solid phthalic anhydride so that it may be withdrawn as liquid therefrom.

Satisfactory operation of the secondary condenser may be readily accomplished by providing a pair of such condensers operating intermittently and a bypass around the primary condenser so that hot gases may be passed from the converter directly to either of the secondary condensers as well as through the primary condenser. In this manner a portion of the hot gases may be used for melting phthalic anhydride in one condenser while the other condenser is being operated normally, the gases and vapors from the first condenser being passed together with the gases and vapors from the primary condenser to the second condenser for further cooling and separation of phthalic anhydride. This procedure may be continued until the first condenser is free from solid phthalic anhydride deposits, after which circulation may be altered so that the hotter gases pass through the second condenser and the final condensation takes place in the first condenser just cleaned. The secondary condensation of phthalic anhydride as well as the primary condensation may be effected at a pressure elevated considerably above atmospheric, normally above 30 pounds per square inch absolute.

In the catalytic oxidation of naphthalene as at present carried out, the reaction vapors are sometimes subjected to a preliminary cooling at about atmospheric pressure to reduce their temperature to around 135° C. but this cooling does not condense liquid phthalic anhydride. By operating the primary cooler or condenser under pressure as herein set forth, a substantial recovery of phthalic anhydride in liquid phase is obtained in this cooler; the higher the pressure the greater will be this recovery. However, the most desirable pressure is determined by a large number of factors besides the percentage recovery of phthalic anhydride as liquid and I have found that by operating with a pressure of 2 to 5 atmospheres absolute in the primary condenser, a recovery of 25% to 75% of the total phthalic anhydride may be obtained as liquid in this condenser. This very greatly reduces the burden on the secondnary condensers in which phthalic anhydride is recovered in solid form.

In order that my invention may be more completely understood, the following description is given in connection with the accompanying drawing showing somewhat schematically apparatus for carrying out the invention.

In the drawing numeral 1 indicates a naphthalene vaporizer of any suitable type. A conventional vaporizer is shown having a steam jacket 2, a gas inlet 3 near the bottom thereof, and a naphthalene inlet 4. An outlet conduit 5 for the naphthalene vapor-oxidizing gas mixture is provided leading to a converter 6. A valved by-pass 7 for gases is provided so that the vapor content of the mixture may be regulated by adding oxidizing gas in the event the gases leaving the vaporizer 1 contain more than the desired ratio of naphthalene to oxidizing gas.

The converter 6 is shown as a well-known type of converter having a catalyst section consisting of tubes filled with an oxidation catalyst, for instance vanadium oxide on a silica or alundum carrier. The tubes are surrounded by a body of a suitable cooling medium such as boiling mercury, vapors from which are condensed in condensers 8 and 8'. A conduit 9 leads from the exit or lower end of the converter 6 to a heat exchanger or primary condenser 10 which may be of any suitable type.

Primary condenser 10 is illustrated as a waste heat boiler having a tube section 11. The reaction gases and vapors pass through the tubes which are surrounded by a body of water. A water inlet 12 and a steam outlet 13 are provided for introduction of water and removal of steam. The water in the cooling section of this heat exchanger may be maintained under pressure to give the desired gas exit temperature. A valved withdrawal pipe 14 is provided at the lower end of the heat exchanger for the removal of liquid phthalic anhydride. A conduit 15 connects the gas exit end of the primary condenser 10 to secondary condensers 16 and 17 through branch conduits 18 and 19. A conduit 20 also leads to these condensers directly from conduit 9, thus bypassing the primary condenser 10.

Condensers 16 and 17 may be of any suitable type and are illustrated as tubular indirect heat exchangers having inlets 21 and 22 for cooling fluid and outlets 23 and 24 therefor. The condensers have draw-offs 25 and 26 for removal of liquid phthalic anhydride and gas exit conduits 27 and 28 leading to the common tail gas withdrawal conduit 29. The condensers are arranged for either parallel or series flow of gases and for this purpose conduits 30 and 31 are provided. Each of the conduits 18, 19, 27, 28, 30, and 31 is provided with a valve so that the flow of gases may be controlled and regulated to provide flow of gas from pipe 15 through either of the condensers or both in series or parallel. The branch conduits 32 and 33 connecting conduit 20 with the condensers also are provided with valves so that flow of hot gases from this pipe may be directed through the condensers in a similar manner either simultaneously with gas from conduit 15 or alternately therewith.

Conduit 29 leads to a scrubber 34 having a spray head 35 and an outlet 36 for scrubbing fluid. Provision of course may be made for recirculating the scrubbing medium, for example by means of a pipe 37 and a pump 38. The scrubber may be of any convenient construction such as a scrubbing tower either containing packing, for instance ceramic material, or free from packing. Outlet conduit 39 leads from the scrubber 34 to a compressor 40. Conduit 39 is also provided with a bleeder 41 having valve 42 arranged to permit the regulated withdrawal of tail gas. Where the compressor is such that it will not be injured by the acids in the tail gas, the scrubber may be placed on the bleed line so that only the bled gases are scrubbed. In this case a much smaller scrubber may be employed.

Compressor 40 is arranged to pump gas from outlet 39 through conduit 43 back into the vaporizer inlet 3. The degree of compression effected by this compressor depends upon the pressure drop in the oxidation and recovery system, which, for efficiency, should be maintained as small as feasible. A compressor 44 on an air inlet line 45 is arranged for supplying additional air to the system. A preheater 46 is arranged on conduit 43 for suitably preheating the mixture of tail gas and air before it is introduced into the vaporizer 1. This preheater may be the same heat exchanger as condenser 10, thus serving to transfer heat from the hot reaction gases to the entering gases; heat of condensing steam may be employed as the heat source as indicated in the drawing.

It will be understood that many mechanical details, such for example as insulation or even steam jackets for connecting pipes and units of the apparatus, suitable provision to avoid stoppages, and temperature regulation and valve control mechanisms to render operation automatic, all fall within the knowledge of the skilled chemical engineer and hence specific reference to such features has been omitted.

The following example serves to illustrate the operation of this apparatus for the conversion of naphthalene to phthalic anhydride by means of air.

By means of compressor 44, air is passed through preheater 46 and heated therein to around 300° C. and is then introduced through inlet 3 into a body of molten naphthalene maintained at an elevated temperature in vaporizer 1. The air passing into the body of naphthalene vaporizes a portion thereof and carries it out through conduit 5 at a temperature in the neighborhood of 200° to 300° C. When a volume ratio of naphthalene to total mixture substantially greater than .75 to 100 is obtained, additional air may be introduced through conduit 7 by suitable regulation of the valve on this conduit. The air-naphthalene mixture enters the catalytic converter 6 where it comes into contact with the vanadium oxide catalyst contained therein so that the naphthalene is oxidized to phthalic anhydride, the temperature of the gases being elevated to about 550° C. during this procedure. The system is preferably maintained under sufficient pressure so that the air-naphthalene mixture leaves the converter at a pressure of 3 atmospheres absolute.

The gaseous reaction mixture leaving the converter 6 contains, in addition to phthalic anhydride and other reaction products, about three-fourths of the original 21% by volume of oxygen in the air. This reaction mixture is passed through conduit 9 to primary condenser 10 while still at a pressure around 3 atmospheres absolute. In condenser 10 it is cooled by indirect heat exchange with water to a temperature of about 131° to about 135° C. By this cooling step, because of the pressure maintained in the system, a relatively large proportion, about 50% to 65%, of the phthalic anhydride is condensed out above its melting point. The liquid phthalic anhydride thus condensed is drawn off through outlet 14.

The gases still at a temperature above the melting point of phthalic anhydride and at elevated pressure are passed through conduit 15 and branch conduit 18 into condenser 16. In condenser 16 the cooling fluid, for instance water, is introduced at 21; passes up through the tubes of the cooling section on the left hand side, down through those on the right, and out at 23. The gases are thus cooled in the condenser 16 to a temperature of about 50° C. so that phthalic anhydride separates out on the exterior surfaces of the condenser tubes as a solid product. The gases pass out from condenser 16 through branches 27 and 30 to condenser 17, down through this condenser where any remaining phthalic anhydride is removed, and out through conduits 28 and 29.

The gases now at a temperature only slightly above atmospheric, say about 40° C., pass into scrubber 34 where they are scrubbed with cold water, which is introduced at 35 and which washes out any traces of remaining phthalic anhydride and also removes maleic anhydride and other solid or liquid constituents present in the gases in small quantities. The gases pass out of scrubber 34 through conduit 39 to compressor 40. A portion, for instance a third of the gases passing through conduit 39, is withdrawn through bleeder 41 by suitable regulation of valve 42. The remainder, which may be at a pressure between 2½ and 3 atmospheres, is recompressed in compressor 40 and passed through conduit 43, where it is mixed with additional air from compressor 44, and thence into vaporizer 1. The volume of air introduced is now reduced so as to equal the quantity of tail gas removed at 41.

Each passage of the mixture of air, tail gas, and naphthalene through converter 6 causes partial oxidation of naphthalene and a corresponding reduction in the amount of oxygen contained in the mixture. It is desired to recirculate the air until substantially 75% of its oxygen content is utilized and hence the tail gas may be recirculated a number of times before introducing any additional air. After several cycles of operation, say three, the oxygen content of the tail gas will be reduced to around 5% by volume and as soon as this occurs sufficient make-up air is introduced in each cycle to just compensate for the oxygen lost by the reducing action of the hydrocarbon thereon and to thus maintain constant oxidizing conditions in the converter. The ratio of air to naphthalene introduced therefore may be only a third that normally employed.

After the gases have passed through primary condenser 10 and secondary condenser 16 for a substantial period of time, the quantity of solid phthalic anhydride in the latter condenser represents a considerable accumulation and in order to maintain the high efficiency of the cooling system, it is desirable to eliminate this product. Accordingly the valve of branch conduit 18 is closed and line 19 is opened so that gases pass from conduit 15 through conduit 19, condenser 17, and branch conduit 28 to conduit 29. The regulating valve on branch 32 is now opened somewhat to permit a portion of the gases from conduit 9 to bypass the primary condenser 10 by means of pipe 20 and enter directly into condenser 16. These gases are at a temperature between 200° and 450° C. The quantity of hot gas is preferably so regulated that it passes through this condenser without being cooled below the melting point of phthalic anhydride. However, at the beginning of passage of hot gas through the condenser, the cooling effect of the cold walls may be such as to lower the temperature below the condensation temperature of phthalic anhydride. This effect is not serious and is rapidly overcome as the walls of the condenser become warm. Circulation of cooling water through the condenser is, of course, discontinued during this step. Steam may be introduced into the portion of the condenser previously occupied by the cooling fluid in order to assist in rapidly raising the temperature of the tubes. The valve on line 27 is still closed and the valve on branch 30 is still open so that the gases from condenser 16 pass into condenser 17, and are further cooled therein along with gases entering from conduit 15 to effect condensation of phthalic anhydride. Liquid phthalic anhydride may be drawn off from condenser 16 by means of valved draw-off 25 during the liquefaction.

There may be some phthalic acid accumulated in condenser 16 and accordingly, after the melting of phthalic anhydride, it may be desirable to further raise the temperature of the condenser for a short time to effect decomposition of phthalic acid, the decomposition temperature of which is considerably higher than the melting point of phthalic anhydride. For this purpose the circulation of steam through the cooling section of condenser 16 may be discontinued unless a relatively high pressure steam is being employed. It will be noted that while ordinary steam at a temperature around 100° C. serves to some extent as a heating medium during the early portion of the condenser heating, it serves as a cooling fluid as the temperature becomes elevated. The decomposition of phthalic acid is preferably effected during the later part of the melting step or immediately after it and the circuit arrangement of the condensers is kept the same except with respect to control of steam.

After decomposition of phthalic acid in condenser 16, the temperature of the condenser ordinarily would be too high to immediately effect satisfactory cooling of the gases and condensation of phthalic anhydride and accordingly it is desirable to pass partly cooled gases through this condenser and then through condenser 17 to complete the condensation. This may be effected by closing the valve on pipe 32, opening the valve on branch 18 of conduit 15 so that gases from conduit 15 pass through condenser 16 up through conduit 30 and into condenser 17. Normal circulation of cooling water through condenser 16, of course, should be resumed during this step of the process.

After the temperature of condenser 16 has been reduced in the desired extent, the valves on lines 18, 28, and 30 may be closed and the valves on lines 27 and 31 opened so that gases pass first through phthalic anhydride condenser 17 and then through condenser 16, and finally out at 29. Since the entire volume of gases from the converter now flows through primary condenser 10 and secondary condenser 17, the additional cooling surface afforded by the series arrangement of condensers is advantageous. Furthermore, the second condenser having just been cleaned, is at its maximum efficiency and serves to uniformly cool the gases to the desired outlet temperature, say to 40° C. and to clean up any phthalic anhydride remaining in the gases. This step may be continued until the efficiency of condenser 17 becomes appreciably impaired by the accumulated phthalic anhydride. When this stage is reached, the phthalic condenser 17 is cleaned by duplicating with respect to condenser 17, the steps just enumerated with respect to condenser 16.

The specific arrangement of phthalic anhydride condensers for recovery of the solid product described above is not claimed herein as this is the subject matter of U. S. application Serial No. 759,970, filed on the same date herewith by Walter H. Kniskern.

I claim:

1. In the preparation of phthalic anhydride by partial oxidation of naphthalene in vapor phase wherein a ratio of around 1 part of naphthalene for 25 to 35 parts of gas is employed and a hot, gaseous mixture containing phthalic anhydride vapors is formed, the improvement which comprises cooling the hot, gaseous mixture while at a pressure between 2 and 5 atmospheres absolute to a temperature slightly above the melting point of phthalic anhydride so as to condense phthalic anhydride in liquid form, and separating liquid phthalic anhydride from the gases.

2. In the preparation of phthalic anhydride by partial oxidation of naphthalene in vapor phase, the steps which comprise passing a mixture of naphthalene and an oxidizing gas in a ratio of about one part of naphthalene to 25 to 35 parts of the gas into a converter at a conversion temperature and a pressure above 2 and not more than 5 atmospheres absolute to convert the naphthalene to phthalic anhydride, cooling the hot, gaseous mixture while yet at a pressure above 2 atmospheres absolute to around 135° C. so as to condense from 25% to 75% of the phthalic anhydride in liquid phase, separating the liquid phthalic anhydride from the gases, and thereafter removing remaining phthalic anhydride from the gases.

3. In the preparation of phthalic anhydride by partial oxidation of naphthalene in vapor phase, the steps which comprise passing a mixture of naphthalene and an oxidizing gas in a ratio of about one part of naphthalene to 30 parts of the gas into a converter at a conversion temperature and a pressure above 2 and not more than 5 atmospheres absolute to convert the naphthalene to phthalic anhydride, cooling the hot, gaseous mixture while yet at a pressure above two atmospheres absolute to around 135° C. so as to condense from 25% to 75% of the phthalic anhydride in liquid phase, separating the liquid phthalic anhydride from the gases, thereafter removing remaining phthalic anhydride from the gases, and recirculating a portion of the residual gases, the pressure of the recirculated gas stream being maintained above about two atmospheres pressure throughout its circuit.

4. In the preparation of phthalic anhydride by partial oxidation of naphthalene in vapor phase, the steps which comprise passing a mixture of naphthalene and an oxidizing gas in a ratio of about one part of naphthalene to 30 parts of the gas into a converter at a conversion temperature and a pressure above 2 and not more than 5 atmospheres absolute to convert the naphthalene to phthalic anhydride, cooling the hot, gaseous mixture while yet at a pressure above two atmospheres absolute to around 135° C. so as to condense from 25% to 75% of the phthalic anhydride in liquid phase, separating the liquid phthalic anhydride from the gases, thereafter removing remaining phthalic anhydride from the gases, bleeding off a portion of the residual gases, adding air to a major portion of the residual gases and recirculating them for oxidation of further quantities of naphthalene, the pressure of the recirculated gas stream being maintained above about two atmospheres pressure throughout its circuit.

5. In the preparation of phthalic anhydride by partial oxidation of a polynuclear aromatic compound in vapor phase wherein a ratio of around 1 part of said compound to 25 to 35 parts of gas is employed and a hot, gaseous mixture containing phthalic anhydride vapors is formed, the improvement which comprises cooling the hot, gaseous mixture while at a pressure between 2 and 20 atmospheres absolute to a temperature slightly above the melting point of the phthalic anhydride so as to condense phthalic anhydride in liquid form, and separating the liquid phthalic anhydride from the gases.

6. In the preparation of phthalic anhydride by the partial oxidation of a polynuclear aromatic compound in vapor phase wherein a ratio of about 1 part of said compound to 25 to 35 parts of an oxygen-containing gas is employed and a hot, gaseous mixture containing phthalic anhydride vapors is formed, the improvement which comprises cooling the hot gaseous mixture to a temperature below the dew-point but above the melting point of the phthalic anhydride, while maintaining the gaseous mixture at a pressure sufficient to raise the dew-point of the phthalic anhydride in the mixture above 131° C., so as to condense phthalic anhydride in liquid form, and separating the liquid phthalic anhydride from the gases.

7. In the preparation of phthalic anhydride by partial oxidation of naphthalene in vapor phase, wherein a ratio of about 1 part of naphthalene for 25 to 35 parts of gas is employed and a hot, gaseous mixture containing phthalic anhydride vapor is formed, the improvement which comprises cooling the hot, gaseous mixture while at a pressure of at least 2 atmospheres absolute to a temperature above the melting point of phthalic anhydride but sufficiently low to condense at least 25% of the phthalic anhydride in liquid phase, and separating liquid phthalic anhydride from the gases.

8. In the preparation of phthalic anhydride by partial oxidation of naphthalene in vapor phase, wherein a ratio of about 1 part of naphthalene for 25 to 35 parts of gas is employed and a hot, gaseous mixture containing phthalic anhydride vapor is formed, the improvement which comprises cooling the hot, gaseous mixture while at a pressure of about 3 atmospheres absolute to a temperature above the melting point of phthalic anhydride but sufficiently low to condense at least 25% of the phthalic anhydride in liquid phase, and separating liquid phthalic anhydride from the gases.

DONALD A. ROGERS.